United States Patent [19]

Roberts

[11] 4,356,636

[45] Nov. 2, 1982

[54] GAUGE FOR TAPERED THREADED BOX AND PIN ENDS OF A JOINT

[76] Inventor: Royce G. Roberts, P.O. Box 1296, Kenai, Ak. 99611

[21] Appl. No.: 197,896

[22] Filed: Oct. 17, 1980

[51] Int. Cl.³ .............................................. G01B 3/36
[52] U.S. Cl. ............................... 33/199 R; 33/174 E; 33/169 B
[58] Field of Search ............. 33/199 R, 174 E, 178 B, 33/169 B

[56] References Cited

U.S. PATENT DOCUMENTS

| | | | |
|---|---|---|---|
| 2,339,699 | 1/1944 | Husband | 33/199 R |
| 3,829,977 | 8/1974 | Lambert | 33/174 E |
| 4,112,355 | 9/1978 | Gibson et al. | 33/174 E |
| 4,216,586 | 8/1980 | Long | 33/178 B |

*Primary Examiner*—Willis Little
*Attorney, Agent, or Firm*—Marcus L. Bates

[57] ABSTRACT

A thread gauge for determining the proper length, taper, and diameter of a threaded member located on the marginal box and pin end portions of joints of casing or tubing. The threaded member of a joint usually has a thread length which can be defined by the distance the threads extend respective to a vanish point located near the end of the joint. The pin gauge of this disclosure is a conical body which has a smooth internal surface formed between a large and small diameter shoulder. The smooth surface defines a frustum of a cone. The box gauge is a second component of this invention, and has an external tapered surface formed between spaced shoulders which defines a frustum of another cone. Visual observable measuring means on the gauges determine that each of the opposed threaded surface of the joint is of proper length and nominal diameter, and is properly positioned respective to the vanish point of the threads. In one embodiment of the invention, the gauge for measuring both the box and pin ends of a joint is made into a unitary annular member. In another embodiment of the invention, the gauge is made in two separate parts, one part for the pin end and the other part for the box end of the joint.

12 Claims, 11 Drawing Figures

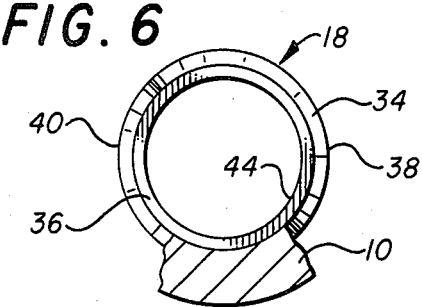
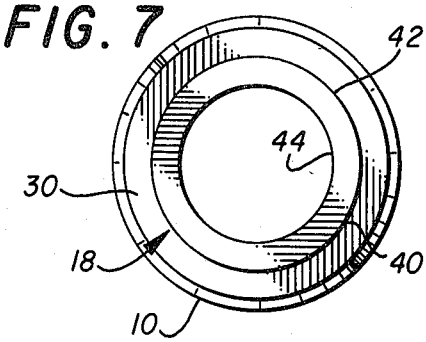
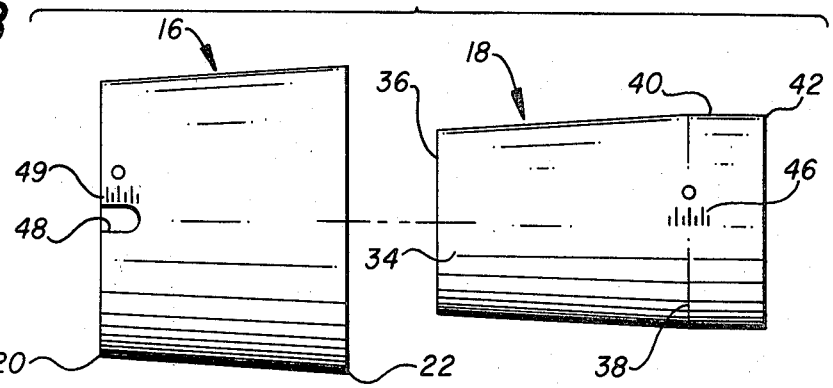
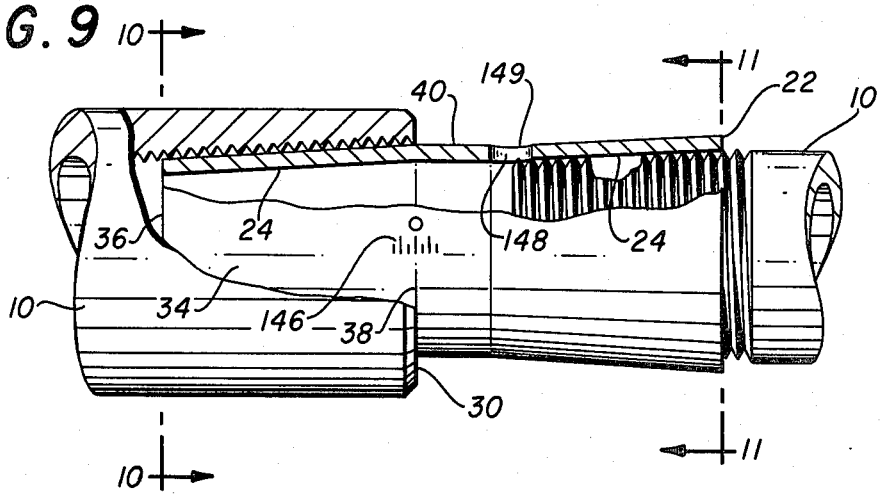
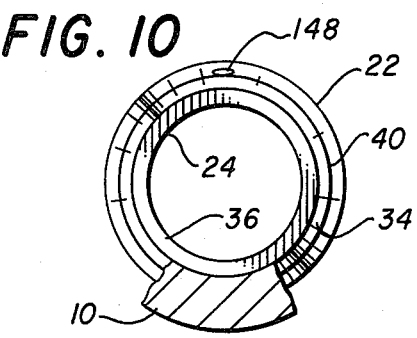
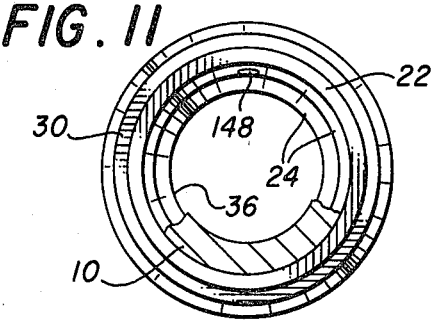

GAUGE FOR TAPERED THREADED BOX AND PIN ENDS OF A JOINT

BACKGROUND OF THE INVENTION

The drilling and production of oilwells require the use of various different tubular goods; such as casing, tubing, subs, stabilizers, guns, and fishing tools; all of which are provided with threaded fastener means. Some of these joints of fluid conductors are provided with both a box end and a pin end, that is, a female and a male threaded surface located at the opposed marginal ends of the joint. The box end has an internal threaded surface which commences at a shoulder at one end of the joint and terminates in a vanish point. The pin end has an external threaded surface located between a vanish point and the other terminal end of the joint, so that when the pin end of one joint threadedly makes up respective to the box end of another joint, the two threaded members engage one another with great force or friction, thereby precluding one member inadvertently being unscrewed from the other.

The threaded ends of joints associated with boreholes have been standardized so that any stabilizer, for example, can be attached to any appropriate size sub, and the entire apparatus series connected within a string. The string likewise is made up of threaded joints, each of which have a box and a pin end, so that any of the above mentioned members can easily be incorporated into most any string.

Oilfield threaded joints are expensive, and from time to time the threaded surfaces thereof become unduly worn, and therefore, in order to economize, the threaded surfaces must occasionally be renewed by reforming the threads at the box and pin ends. This always shortens the joint a small amount. When the new threaded surface is formed on the joint, the joint usually is placed in an engine lathe, and special cutting tools are then employed to reform the opposed threaded ends of the joint, and then a thread gauge having threads thereon made complementary respective to the box and pin ends is threadedly made up with respect to the newly formed threaded surface. The machinist usually engages the lathe motor so that the joint is slowly turned while the prior art gauge threadedly makes up until the shoulder of the gauge abuttingly engages the new shoulder of the threaded member. Usually the gauge must be "tried" several times, with the threaded surface being progressively, slightly recut, depending upon the tightness or error of the new threads. Hence, the present art requires that the threads of the new pin or box end is gauged by trial and error, and therefore, the efficiency of the new threads is largely dependent upon the skill of the machinist.

As the prior art gauge is held stationary and the joint turned in order to threadedly make up with the gauge, sometime the tool will prematurely make up, causing the gauge device to rotate with the joint. This is a dangerous practice because the machinist can be pulled into the revolving massive equipment and injured. Moreover, as the gauge is repeatedly used, it becomes progressively worn and inaccurate, and ultimately must be replaced.

Accordingly, it would be desirable to have a means by which the threaded box and pin ends of a joint can be rapidly and efficiently gauged. It would be desirable if such a gauge did not have to be threadedly made up respective to the box and pin ends, and which did not significantly wear with use, and which included means indicating the precise additional material to be removed so as to reduce working time and enhance safety, thereby providing a low cost thread gauge. Such a desirable tool is the subject of this invention.

SUMMARY OF THE INVENTION

A thread gauge for determining the proper length, taper, and mean diameter of a threaded member, such as a casing or pipe joint, which has a box end opposed to a pin end. Each of the tapered threads commences at the opposed ends of the joint and terminates at a vanish point. The vanish point of the pin end is substantially aligned with the vanish point of the box end of another joint when the threaded members are threadedly "made up".

The thread gauge for the pin has a smooth internal surface disposed between a large and small diameter shoulder, with the distance between the shoulders defining the height of a frustum of a cone. The gauge for the box has a smooth external tapered surface formed between spaced shoulders which also define another frustum of a cone.

The gauge includes visual observable means which determines that the threaded surface is of proper length, taper, and diameter, and that the threaded area is properly positioned respective to the shoulder of the threaded member.

In one form of the invention, the box and pin gauges are two separate members, one for the box end of the joint, and the other for the pin end of the joint. In another form of the invention, indicia is provided on the gauges which indicate whether the threads of the joint have been properly formed.

In another embodiment of the invention, an aperture is formed radially through the sidewall of the marginal small diameter end of the pin gauge so that the terminal end of a newly formed threaded surface can be visually observed in order to determine the accuracy with which the new threads have been formed.

In another embodiment of the present invention, the box and pin gauges are made integrally respective to one another to provide a unitary gauge having an external surface which can gauge the box end threads, and an internal surface which can gauge the pin end threads.

A primary object of the present invention is the provision of a gauge for measuring the tolerance of the threaded surface on the pin end of a joint.

Another object of the present invention is the provision of a gauge which can be used to measure the correctness with which the threads have been formed on the box end of a joint.

A further object of the present invention is the provision of a combination tool having an inside surface which measures the accuracy of threads formed on the pin end of a joint, and which further includes an outside surface for measuring the accuracy of the threads formed on the box end of a joint.

A still further object of this invention is the provision of a gauge for measuring the threads formed at the pin and box ends of a pipe joint, which includes indicia thereon related to the mean diameter and length of the threaded surface of the joint.

Another and still further object of this invention is the provision of a gauge for determining the mean diameter of a tapered, external and internal threaded area, which includes means by which the relative size of the tapered threads can be visually determined.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 6 is a cross-sectional view of part of the apparatus disclosed in FIG. 5, looking in the direction indicated by the arrows at numerals 6—6;

FIG. 7 is an end view of part of the apparatus disclosed in FIG. 5, looking in the direction indicated by the arrows at numerals 7—7;

FIG. 8 is an exploded, side elevational view which sets forth the two tools previously disclosed in various ones of the foregoing figures;

FIG. 9 is a part cross-sectional view of still another embodiment of the present invention;

FIG. 10 is a cross-sectional view of the tool of FIG. 9 looking in the direction indicated by numerals 10—10; and, FIG. 11 is a cross-sectional view taken along line 11—11 of FIG. 9.

DETAILED DESCRIPTION OF THE PREFERRED EMBODIMENT

Figure 1:
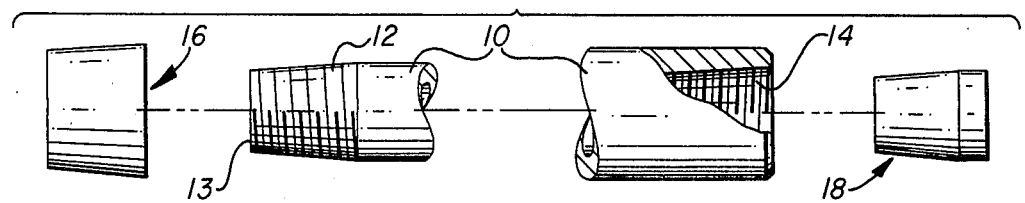
FIG. 1 is an exploded, side elevational view which discloses a prior art tool joint and a pair of thread gauges made in accordance with the present invention associated therewith.

In FIG. 1, there is disclosed a prior art joint of fluid conductor 10, such as a joint of casing or tubing, or the like. The joint has the usual opposed threaded ends 12 and 14, with the male end 12 being referred to as the pin end, or the pin, and the female or coupled end 14 being referred to as the box end or box. A thread gauge 16 and 18, made in accordance with the present invention, is used to determine the accuracy with which the threaded ends 12 and 14 have been made. The gauge 16 is used to measure the accuracy of the pin threads 12, while the gauge 18 is used to measure the accuracy of the box threads 14.

Figure 2:
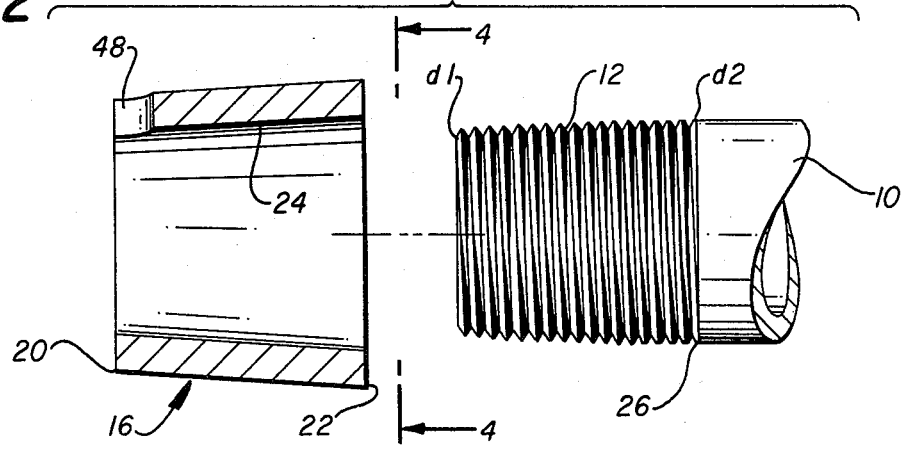
FIG. 2 is an enlarged, exploded, fragmentary, part cross-sectional view of part of the apparatus disclosed in FIG. 1.
Figure 3:
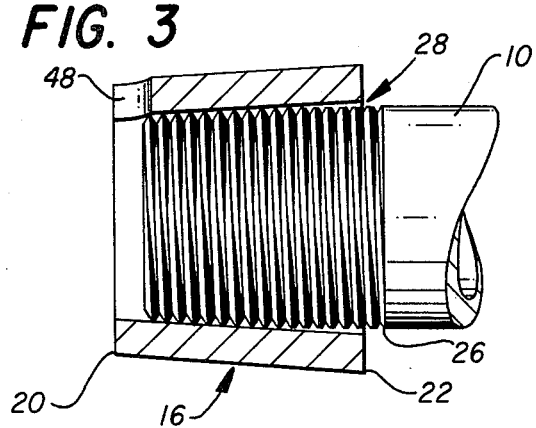
FIG. 3 illustrates the apparatus shown in FIG. 2 in an operatively assembled relationship.
Figure 4:
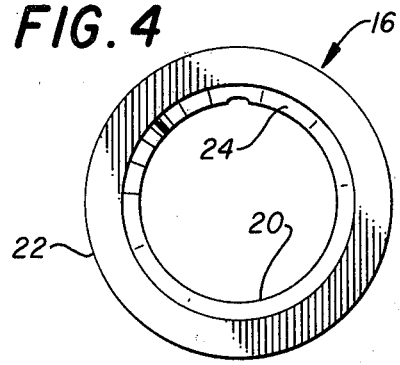
FIG. 4 is an end view of part of the apparatus disclosed in FIG. 2, taken along line 4—4 thereof.

In some of the remaining figures of the drawings, and in particular the enlarged views seen in FIGS. 2-4, the pin gauge 16 is seen to have a small diameter shoulder 20 axially spaced from a large diameter shoulder 22, thereby defining the length of the interior smooth surface 24, wherein the inside surface 24 defines a frustum of a cone.

The interior surface 24 of the pin gauge is of a configuration to be snugly and uniformly received about the pin threads in seated relationship therewith, assuming that the exterior threaded surface of the pin has been properly formed. In such an instance, the large diameter face, or shoulder 22, is positioned in closed proximity of vanish point 26 of the threads. The vanish point 26 therefore forms the inward termination of the pin threads 12. Accordingly, the length and mean diameter of the threaded surface 12 determines the magnitude of the gap 28 which results from the spaced apart relationship of the shoulder and vanish point, 22 and 26, respectively. The term "means diameter of the threads" is intended to denote the value of the thread diameter $d1-d2 \div 2$.

Figure 5:
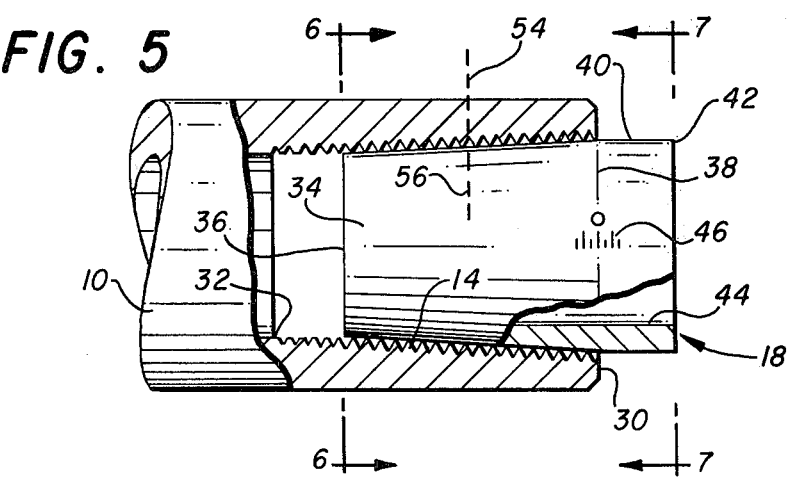
FIG. 5 is an enlarged, fragmentary, part cross-sectional detail of part of FIG. 1.

As seen in FIGS. 5-7, together with other figures of the drawings, the threads formed at the box end of the joint commence in proximity of a shoulder 30, formed at the terminal end thereof, and inwardly tapered towards the vanish point 32 of the box, which is also towards the medial portion of the joint. Hence, the box threads terminate at 32 in spaced relation respective to the shoulder 30. The box gauge 18 includes a cylindrical outer surface 34 formed between a small diameter face, or shoulder 36, and a large diameter shoulder 38 thereof, with the intervening outer surface area located between the shoulders 36 and 38 describing a frustum of a cone which coincides with the configuration presented by the box threads. The outer, or large, marginal end portion of the box gauge is preferably of constant diameter at 40 to form a boss. This provides material for fabricating the before mentioned shoulder 38, which preferably lies inwardly in spaced relationship respective to the terminal end portion 42. An axial passageway 44 extends along the longitudinal central axis of the box gauge, which coincides with the longitudinal axial centerline of the joint, and which is considered a lightening hole.

Indicia 46 is located on shoulder 38. The shoulder 30 of a perfectly formed box is aligned with "0" of the indicia of the gauge. Those skilled in the art can possibly apply other indicia which, of course, would fall within the comprehension of this invention.

In FIG. 8, there is disclosed a set of gauges comprising the before mentioned pin gauge 16 and box gauge 18. The set of gauges jointly enable a technician to rapidly determine the acceptability of the box and pin ends of a tool joint. As seen in FIG. 8, a slot 48 is formed radially through a sidewall of the pin gauge, where indicia 49 is included. This enables the precise location of the terminal end 13 of the pin end of a threaded joint to be observed. The terminal end 13 of a perfectly formed pin end of a threaded joint is aligned with "0" of the indicia of the gauge. Indicia 49 enables the relative mean diameter of the pin threads to be rapidly determined.

In the embodiment of FIGS. 9-11, the gauges 16 and 18 of the first embodiment of the invention are advantageously made integrally respective to one another by forming the before mentioned surface 34 of the box gauge exteriorally of the unitary gauge body, while forming the inside surface 24 of the pin gauge interiorally of the unitary gauge body. The gauge of FIG. 9 is used to measure both the pin and box ends of a joint. In FIG. 9, the inclusion of a slot 148 and indicia 146, 149 in the before illustrated manner of FIG. 8 enables exact measurements to be made of the box and pin threads of a joint.

The operation of the gauges of this disclosure is explained in conjunction with a prior art joint 10 having opposed box and pin ends which have become unduly worn. The joint is first chucked in a hollow spindle lathe and the threads 12 and 14 reformed in the usual manner. After the threads have been turned, the gauge is used to measure the accuracy of the completed threads. The pin end is gauged in the illustrated manner of the drawings by axially sliding the pin gauge into the illustrated seated position of FIG. 3, for example. Should terminal end 13 align with "0" of the indicia of the gauge, the pin end lies within the accepted tolerance so far as regards the mean diameter of the threads and the location of the threads respective to vanish point 26. Such a pin should suitably mate up with any complimentary box end of any other joint, assuming that the threads of the other joint has been properly manufactured within the recommended standard tolerances.

Should the tolerance be excessive in either direction, the threads must again be turned an appropriate amount to cause the measurement thereof to fall within the accepted tolerance.

The box end is gauged by axially sliding the tapered surface 34 of gauge 18 into the threaded box end of a joint, and observing the location of end 30 of the joint respective to the shoulder 38. Indicia at 46 facilitates accurately determining the spaced apart relationship between shoulders 30 and 38. Should shoulder 30 and 38 coincide with one another, the threads are satisfactory; but, if there is excessive spacing at this location, the threads must be reformed an amount to provide the proper tolerance.

Numeral 54 indicates the mean diameter of the threaded surface 14, while numeral 56 indicates the mean diameter of the smooth tapered surface 34. As seen in FIG. 5, when the location of these two recited mean diameters lie along a common plane arranged perpendicular to the longitudinal axial centerline of the joint, and the shoulder of the threaded joint is precisely spaced from the plane, the threaded joint 14 has been precisely formed. This is evidenced by the shoulder or end portion 30 of the box end coinciding with "0" of the indicia 46.

The embodiment of FIG. 9 can be utilized for gauging both the pin and box ends by utilizing the smooth outer surface 34 for gauging the box end of a joint, and the smooth interior surface 24 for gauging the pin end in the before described manner. A slot 148 and indicia, 146 and 149, are incorporated into this embodiment of the tool and used in the before described manner.

In the above operation, where the mean diameter of the threaded surface of the joint has been made excessively large or small, the indicia at 146 and 149 provides a rapid means by which a technician can accurately judge the amount of additional material to remove from the threads to provide a close tolerance fit at the box box and pin ends of a joint.

I claim:

1. In a fluid conductor joint having a tapered threaded pin end opposed to a tapered threaded box end, the threads of which commence at a terminal end and terminate at a vanish point; the combination with said joint of a thread gauge for determining the acceptable limits of the length, mean diameter, and taper of the threads of said pin and box ends;
   said thread gauge includes a main body having a small diameter end spaced from a large diameter marginal end portion thereof, with there being a circumferentially extending boss formed at said large diameter marginal end portion;
   a tapered surface in the form of a frustum of a cone located between said large and small diameter portions; the surface of the cone has a taper made complementary respective to the optimum taper of the threaded joint;
   and means for measuring the relative position of the mean diameter of the threaded surface with respect to the mean diameter of the tapered surface of the gauge.

2. The combination of claim 1 and further including an axial bore formed within said main body, said axial bore having a smooth internal surface in the form of a frustum of a cone which is concentrically arranged respective to the external surface, said internal surface has a taper which coincides with the taper desired of the pin end of said joint, said internal surface includes means thereon for determining the relative position of the mean diameter of the internal smooth surface respective to the mean diameter of the pin threads.

3. The combination of claim 2 wherein said means for measuring the spaced relationship is an aperture formed radially through a sidewall of the gauge at the marginal small diameter end thereof so that the marginal, threaded end of a joint can be observed therethrough.

4. A gauge for determining the acceptable limits of the diameter, length, and taper of the threads which form the box and pin ends of a joint comprising:
   a body having a first smooth tapered surface formed internally thereof for receiving the threads of the pin end of a joint therewithin;
   said smooth surface describes a frustum of a cone, and is tapered to present a surface which bears against the threads of the pin end when the gauge is slidably received against the threads of the pin end with the axial centerline of the cone coinciding with the axial centerline of the joint;
   said tapered surface being located between a face formed at the large diameter end thereof and a face formed at the small diameter end thereof, with the faces being parallel to one another and perpendicular to the longitudinal axial centerline of the gauge;
   said tapered surface extends 360° about the threads and uniformly bears thereagainst; said gauge includes means for determining the relative position of the mean diameter of the threads of the pin respective to the mean diameter of the tapered surface of the gauge;
   and a second smooth tapered surface formed about the outer surface of said body in concentric relationship respective to the first surface, said second surface is in the form of a frustum of a cone and is made complementary respective to the threaded surface of the box end of the joint; and,
   means for determining the axial distance between the mean diameter of the second smooth surface and the last said threads when the second smooth surface is seated on the threads of the box end of the joint.

5. The gauge of claim 4 wherein said means for measuring the spaced relationship is the measured distance between the terminal large diameter end of the gauge and the terminal end of the joint.

6. The gauge of claim 4 wherein said means for measuring the spaced relationship is an aperture formed radially through a sidewall of the gauge at the marginal small diameter end thereof so that the marginal, threaded end of a tool joint can be observed therethrough.

7. A gauge for gauging the mean diameter and length of a tapered threaded surface formed on a pipe joint, said gauge having a small diameter end spaced from a large diameter end by a smooth external surface in the form of a frustum of a cone;

said surface is uniformly tapered between said large and small diameter ends and coincides with the optimum desired taper of the threaded surface to be gauged;

the mean diameter of the thread gauge is of a value which positions one end of the gauge in spaced relationship respective to one of the threaded terminal ends of the pipe joint;

and means for measuring the spaced relationship between the end of the gauge and the terminal end of the thread to thereby determine that the diameter and length of the threads fall within the optimum desired limits;

said means for measuring the spaced relationship is an aperture formed radially through a sidewall of the gauge at the marginal small diameter end thereof so that the marginal, threaded end of a joint can be observed therethrough.

8. A thread gauge for gauging the mean diameter and length of a tapered threaded surface formed on a joint, said thread gauge includes a small diameter end spaced from a large diameter end by a smooth external surface in the form of a frustum of a cone;

said surface is uniformly tapered between said large and small diameter ends and coincides with the optimum desired taper of the threaded surface to be gauged;

the mean diameter of the thread gauge is of a value which positions one end of the thread gauge in spaced relationship respective to one of the threaded terminal ends of the joint;

said gauge includes a boss at the large diameter end thereof which extends axially away from the small diameter end; and means forming indicia at the large diameter end by which the axially spaced relationship of the large diameter end and the threaded terminal end of a joint can be visually observed.

9. A gauge for gauging the mean diameter and length of a tapered threaded surface formed on a member, said gauge has a small diameter end spaced from a large diameter end by a smooth internal surface in the form of a frustum of a cone;

said surface is uniformly tapered between said large and small diameter ends and coincides with the optimum desired taper of the threaded surface to be gauged;

the mean diameter of the tapered surface is of a value which positions one end of the gauge in spaced relationship respective to the terminal end of the threaded surface of the member;

means for measuring the spaced relationship between the small diameter end of the gauge and the terminal end of the thread to thereby determine that the diameter and length of the threads fall within the optimum desired limits, said means for measuring includes a radial cutout placed in the marginal small diameter end thereof through which the threaded terminal end of the joint can be observed; and means forming indicia at the marginal small diameter by which the axially spaced relationship of the small diameter end and the threaded terminal end of a member can be visually observed.

10. The gauge of claim 9 wherein the external surface is uniformly tapered from a large to a small diameter end to provide a thread gauge which can be used to gauge the threads located on a box end of a member.

11. A thread gauge for gauging the mean diameter and length of a tapered threaded surface formed on a pipe joint, said gauge has a small diameter end spaced from a large diameter end by a smooth external surface in the form of a frustum of a cone;

said surface is uniformly tapered between said large and small diameter ends and coincides with the optimum desired taper of the threaded surface to be gauged;

the mean diameter of the external surface of the thread gauge is of a value which positions one end of the thread gauge in spaced relationship respective to one of the threaded terminal ends of the pipe joint;

means for measuring the spaced relationship between said one end of the thread gauge and the terminal end of the pipe joint to thereby determine that the diameter and length of the threads fall within the optimum desired limits;

an axial bore formed through the gauge to provide an internal surface spaced from said external surface; said internal surface is concentrically arranged and inwardly spaced respective to the external surface, and includes means for measuring thereon for determining the relative position of the mean diameter of the internal smooth surface respective to the mean diameter of the other threaded ends of the pipe joint.

12. The gauge of claim 11 wherein said means for measuring is an aperture formed radially through a sidewall of the gauge at the marginal small diameter end thereof so that the marginal, threaded end of a joint can be observed therethrough.

* * * * *